United States Patent
Denkin et al.

(10) Patent No.: US 6,205,790 B1
(45) Date of Patent: Mar. 27, 2001

(54) EFFICIENT THERMOELECTRIC CONTROLLER

(75) Inventors: Nathan M. Denkin, Matawan; Thomas F. Link, Aberdeen, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/322,936

(22) Filed: May 28, 1999

(51) Int. Cl.$^7$ ............................................. F25B 21/02
(52) U.S. Cl. ........................................... 62/3.7; 165/255
(58) Field of Search ..................... 62/3.7, 214, 159; 165/255, 259

(56) References Cited

U.S. PATENT DOCUMENTS

| | | | |
|---|---|---|---|
| 4,333,519 | * 6/1982 | Shafrir et al. | 165/12 |
| 5,038,851 | * 8/1991 | Mehta | 165/12 |
| 5,211,713 | * 5/1993 | Suyama | 165/2 |
| 5,245,835 | * 9/1993 | Cohen et al. | 62/159 |
| 5,450,727 | * 9/1995 | Ramirez et al. | 62/3.7 |
| 5,564,276 | * 10/1996 | Abadilla et al. | 62/3.7 |
| 5,682,748 | * 11/1997 | DeVilbiss et al. | 62/3.7 |
| 5,689,957 | * 11/1997 | DeVilbiss et al. | 62/3.7 |
| 5,690,849 | * 11/1997 | DeVilbiss et al. | 62/3.7 |
| 6,055,815 | * 5/2000 | Peterson | 62/3.7 |

* cited by examiner

*Primary Examiner*—Corrine McDermott
*Assistant Examiner*—Chen-Wen Jiang
(74) *Attorney, Agent, or Firm*—Frederick B. Luludis

(57) ABSTRACT

The temperature of a thermo-electric cooler that is used to cool a laser is effectively controlled using a monitor which accurately and continuously measures the temperature of the thermo-electric cooler and using apparatus that determines the difference between the measured temperature and a desired thermo-electric cooler temperature. A discriminator circuit causes the thermo-electric cooler to enter (a) a heating cycle when such difference is below a first reference level or (b) a cooling cycle when such difference reaches a reaches a second reference level. Power consumption within the associated cooling/heating system is also accurately controlled using a pulse width modulated power supply to provide the voltage signal that drives the thermoelectric cooler.

12 Claims, 2 Drawing Sheets

EFFICIENT THERMOELECTRIC CONTROLLER

FIELD OF THE INVENTION

The invention relates to ThermoElectric Coolers (TEC), and more particularly relates to an efficient controller for a TEC.

BACKGROUND OF THE INVENTION

It is well-known that the temperature of the active layers of a semiconductor laser must be closely controlled to operate the laser within close tolerances for both wavelength and power. A so-called ThermoElectric Cooler (TEC) is often used for this purpose, since a TEC can be controlled to either add or extract heat from a laser depending on whether the desired operating temperature is above or below the ambient temperature. However, the amount of power used to cool a high power laser to a desired temperature could exceed the amount of power that is used to drive the laser. This could lead to thermal runaway, since the additional power supplied to cool the laser may increase the temperature of the operating environment of the laser, rather than decreasing it.

A number of controllers have been developed to control the operation of a TEC, and thus the cooling/heating of a semiconductor laser. Included among these prior art controllers is the so-called proportional controller illustrated in FIG. 1. The proportional controller uses two power supplies, 5-1 and 5-2, which output voltages of opposite polarities but nomially of equal levels, e.g., ±5 volts, which are supplied to TEC 6 via transistors Q6 and Q8, respectively, under control of amplifier 4. Transistors Q6 and Q8 are controlled by amplifier 4, which is connected to TEC 6 via feedback loop 6-1. The voltage level in the feedback loop changes as the resistance of a thermister in TEC 6 changes, which indicates the current level of cooling at TEC 6. That is, the TEC thermister is connected to a conventional balanced bridge circuit in the RF filter and amplifier circuit. The amplifier circuit amplifies an error signal that is developed across the bridge when the bridge is not balanced, and uses the amplified signal to "turn on" either transistor Q6 or Q8 a certain amount to respectively increase the cooling or heating that TEC 6 is supplying to the laser (not shown).

Disadvantageously, we have recognized that the control arrangement of FIG. 1 is inefficient, since each of the power supplies 5-1 and 5-2 have to operate at full voltage, even when only a fraction of that voltage level is being supplied to TEC 6. For example, assume that each power supply needs to be at 5 volts to provide maximum cooing. If TEC 6 currently needs only 1 volt of cooling, then the remaining 4 volts would be dissipated across the respective one of the transistors Q6 or Q8 that is currently delivering the 1 volt to TEC 6.

Another prior art controller which uses just one power supply is shown in FIG. 2. Power supply 9, more particularly, supplies a voltage signal, +TEC, and RTN (return) signal, to the TEC and RTN inputs of conventional H-bridge 10. H-bridge 10 switches its inputs (+TEC and RTN) to its TECA and TECB outputs based on a set of logic signals that it receives via logic inputs COOL and HEAT. For example, if the input designated Heat is at a first logic level, e.g., ground/return, and the input designated COOL is at an second logic level, e.g., +5 volts, then H-bridge 10 switches its +TEC input to its TECA output and switches its RTN input to its TECB output, which are directly supplied to TEC 12 and which causes TEC 12 to enter a heating cycle.

For the reverse case, in which the input designated HEAT is at the second logic level and the input designated COOL is at the first logic level, then H-bridge 12 switches its TEC input to its TECB output and switches its RTN input to its TECA output, which causes TEC 12 to enter a cooling cycle. Similarly, the TEC 12 thermister serves as an element in a balanced bridge within RF filter and amplifier circuit 7 to control the amount of cooling/heating that is supplied to a system laser (not shown). Circuit 7 amplifies the signal that the bridge outputs, and supplies the amplified result to comparator 8. Comparator 8, in turn, compares the amplified signal with a control signal indicative of the desired level of such cooling to determine if the level of the amplified signal is above (cool) or below (heat) the level of the control signal, and then adjusts the COOL and HEAT logic levels accordingly.

We have recognized that the controller of FIG. 2, for the most part, continuously alternates between a cooling cycle and heating cycle. The reason for this is that power supply 9 continuously supplies a voltage level that provides maximum cooling (or heating). That is, when the latter voltage level is supplied to TEC 12, TEC 12 cools the semiconductor laser toward a maximum level. Since there is a delay between the time such cooling occurs and the time that the thermister signal reaches a level indicative thereof, the cooling that TEC 12 provides significantly overshoots the target level. At that point, amplifier 7 and comparator 8 invoke a heating cycle to drive the overcooling of the laser to the target temperature. The heating cycle similarly overshoots the target level which drives the level of heating at the laser beyond the desired level. At that point amplifier 7 and comparator 8 invoke a cooling cycle, and so on. The power expended to alternately provide such heating and cooling can result in the loss of an appreciable level of power as is illustrated in FIG. 3 by the shaded portions of the power diagram.

SUMMARY OF THE INVENTION

We address the foregoing problems, in accordance with various aspects of the invention, by comparing a difference signal indicative of the difference between the temperature of the thermoelectric cooler and a desired thermoelectric cooler temperature against first and second reference levels such that when the level of the difference signal is below the first reference level then the discriminator circuit causes the thermoelectric cooler to enter a heating cycle and such that when the level of the difference signal reaches the second reference level then the discriminator circuit causes the thermo-electric cooler to enter a cooling cycle.

We also accurately control the power consumption within the associated cooling/heating system using a pulse width modulated power supply to provide the voltage signal that drives the thermo-electric cooler.

These and other aspects of the claimed invention will become more apparent from the following detailed description and corresponding drawings.

DETAILED DESCRIPTION

Figure 4:
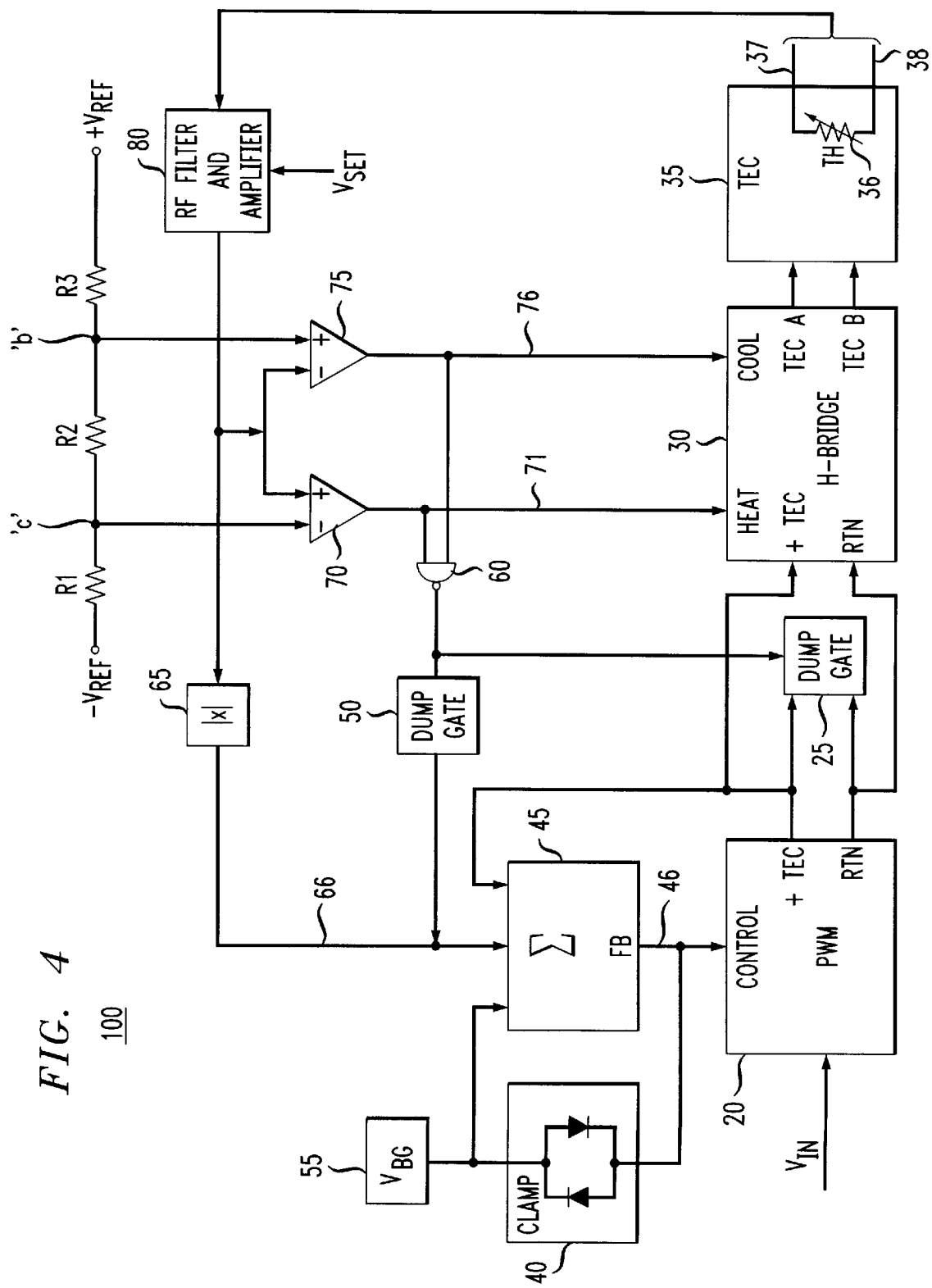
FIG. 4 is a block diagram of a TEC controller arranged in accordance with the principles of the invention.

An illustrative embodiment of our invention is shown in FIG. 4 and includes a conventional Pulse Width Modulator (PWM) 20 which modulates Vin, e.g., +5 volts, in accordance with a duty cycle that is controlled as a function of the level of a control signal supplied via path 46. The level of the voltage that PWM 20 outputs across its +TEC and RTN output terminals increases as the PWM 20 duty cycle increases and vice versa. The PWM 20 duty cycle increases and decreases as the level of the path 46 signal increases and decreases, respectively. The voltage signal that PWM 20 outputs to the aforementioned output terminals is supplied to dump gate 25 (discussed below) and conventional H-bridge 30. When the level of a 'C' (cool) control signal supplied via lead 76 is at the aforementioned first logic level, then H-bridge 30 switches its +TEC and RTN inputs directly to its output terminals TECA and TECB, respectively. When the level of a 'H' (heat) control signal supplied via lead 71 is at the first logic level then the H-bridge switches its +TEC and RTN inputs to the circuit 30 output terminals TECB and TECA, respectively.

The TECA and TECB outputs connect directly to conventional Thermo-Electric Cooler (TEC) 35, whose temperature increases during a heating cycle and decreases during a cooling cycle, as is well-known. The temperature of TEC 35 is monitored by a conventional termperature sensitive device, e.g., THermister (TH) 36, which is wired directly into a conventional balanced bridge circuit contained in RF filter and amplifier 80, as discussed above. As is also well-known, the resistance of a thermister is related to the temperature of the environment in which the thermister is located, i.e. TEC 35.

Similarly, RF filter and amplifier circuit 80 using a conventional difference circuit measures the difference between the voltage level developed across the bridge and the level of a voltage signal, Vset, indicative of a desired temperature setting for TEC 35. The amplifier of circuit 80 greatly amplifies the difference signal and supplies the amplified difference signal to conventional absolute circuit 65, which outputs the absolute value of the amplified difference signal to path 66 extending to one input of summing circuit (Σ) 45. The amplified difference signal is also supplied to comparators 70 and 75 in the manner shown in FIG. 4.

The level of the signal supplied by absolute circuit 65 is summed at summing circuit 45 with (a) a reference signal, $V_{BG}$, supplied by source 55 and (b) the level of the signal that PWM 20 outputs to its +TEC output terminal. The level of the reference signal/voltage, $V_{BG}$, is set to, for example, 1.25 v, to offset a so-called band-gap voltage that is inherently developed in PWM 20. In this way, an offset voltage is supplied to PWM 20 when the difference signal is close to zero, indicating that the TEC 35 temperature is substantially at the target level.

The level of the control (or feedback) signal that summing circuit 45 supplies to PWM 20 via path 46 is also restricted by clamp 40—which means that the level of the control signal will vary by no more than $V_{BG}\pm0.7$ v established by the voltage drop across clamp 40.

As mentioned above, the amplified signal supplied via the output of circuit 80 is also supplied to comparators 70 and 75. Comparators 75 and 70, gate 60 and the signal levels provided across resistors R1, R2 and R3 form a discriminator circuit which controls the switching at H-bridge 30. As discussed above, such switching controls the heating and cooling at TEC 30. Specifically, the voltage level that is set at point 'b' represents a high temperature limit and the voltage level that is set at point 'c' represents a low temperature limit. For example, if the TEC 35 target temperature is, e.g., 25° C., then the lower and upper limits may be, e.g., 24° C. and 26° C., respectively. The "b' voltage level is supplied to the + input of comparator 75 and the 'c' voltage level is supplied to the – input of comparator 70. In this way, The TEC 35 temperature, as characterized by the resistance of thermister 36 and ultimately the value of the difference signal, is compared simltaneously with the low and high limits. If the TEC 35 temperature is found to be low, then the comparison performed by comparator 70 will be true, which causes comparator 70 to supply a control signal, e.g., the aforementioned first logic level, to H-bridge 30 via path 71. Receipt of the latter logic level at the H input of control bridge 30, causes the bridge to connect its input terminals +TEC and RTN (and thus the input voltage signal) directly to the TECA and TECB terminals extending to TEC 35. TEC 35, in turn, enters a heating cycle. If the TEC 35 temperature reaches the high limit, then the comparison performed by comparator 75 will be true, thereby causing that comparator to similarly supply the first logic level to H-bridge 30 via path 76. Receipt of the latter logic level at the C input of control bridge 30, causes the bridge to connect input terminals +TEC and RTN in reverse order to the TECA and TECB output terminals, which effectively reverses the polarity of the voltage signal supplied to TEC 35. TEC 35, in response thereto, enters a cooling cycle, all in accordance with an aspect of the invention.

Figure 1:
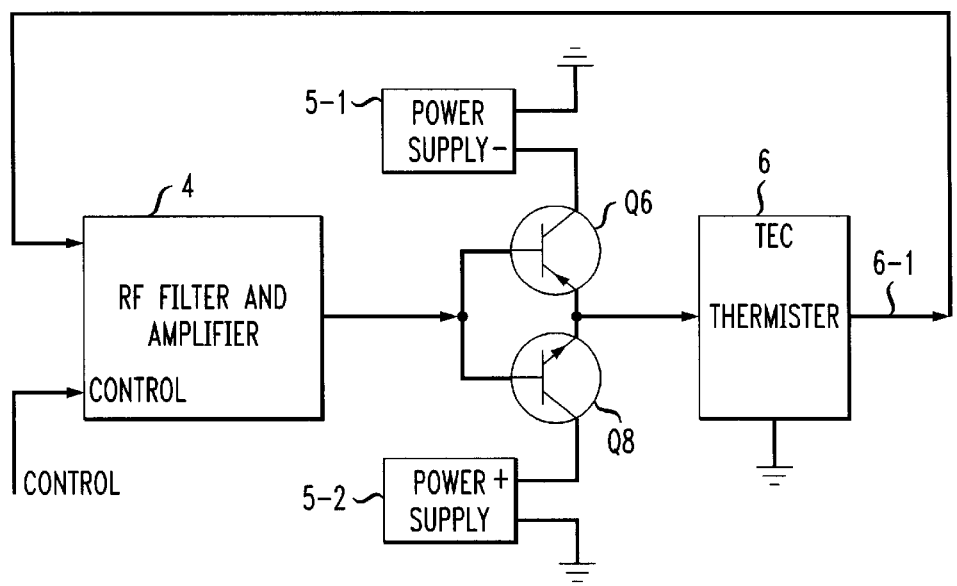
FIGS. 1 and 2 show in block diagram form prior art TEC controllers.
Figure 2:
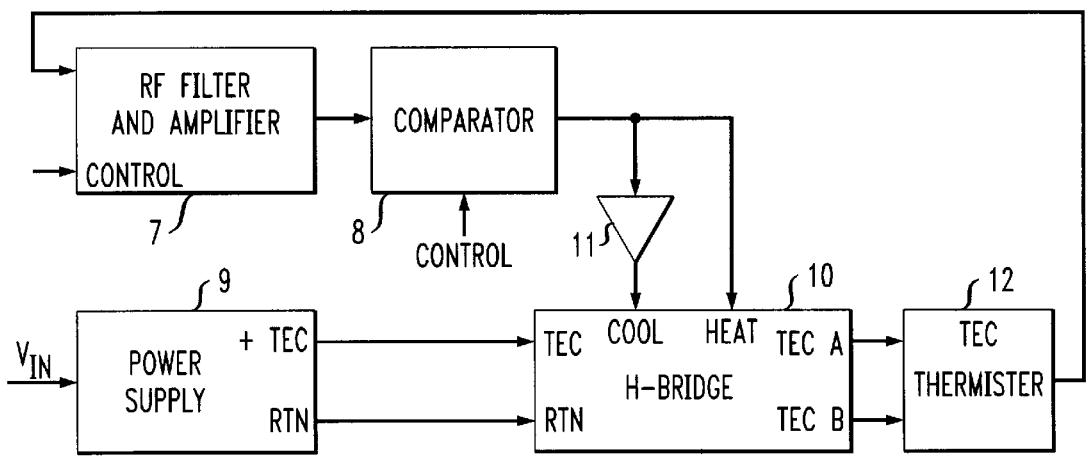
Figure 3:
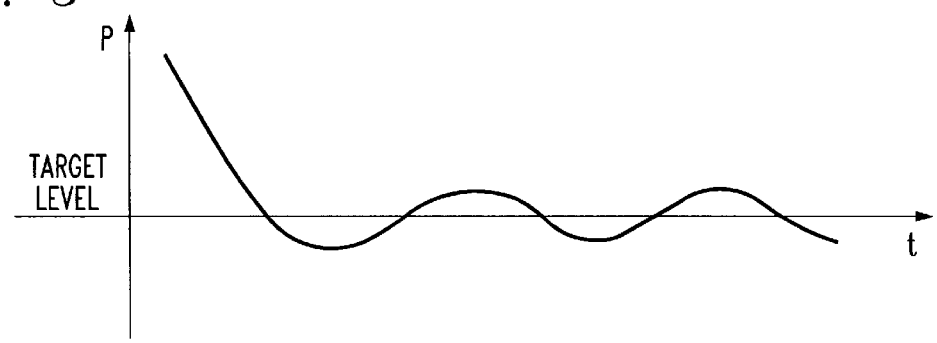
FIG. 3 illustrates a power/temperature diagram for the controller of FIG. 2.

As mentioned above and as illustrated in FIG. 3 for prior art systems, there is a delay between the time that such cooling (heating) occurs and the time that the thermister signal reaches a level indicative thereof, which causes the cooling (heating) that TEC 12 provides to significantly overshoot the target level. At that point, the TEC controller invokes a heating (cooling) cycle to drive the overcooling (overheating) of the laser to the target temperature. We deal with this problem by shunting the PWM 20 output voltage toward zero using dump gate 25, all in accordance with an aspect of the invention. We also shunt to zero any residual voltage contained in absolute circuit 50 using dump gate 50. In an illustrative embodiment of the invention, gates 25 and 50 may be, for example, an FET switch that switches (shunts) an input signal to ground via a resistor. More particularly, when the level of the amplified difference signal is between the voltage levels at points 'b' and 'c', respectively, then the comparison performed at comparators 70 and 75 fails, which causes both of those comparators to output a control signal indicative of the second logic level. NAND gate 60, responsive to both outputs of comparators 70 and 75 being concurrently at the latter logic level, switches its output level to a low logic level. The low logic level at the output of gate 60 activates dump gates 25 and 50, which then operate in the manner described above.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope.

We claim:

1. A system comprising
   a thermo-electric cooler,
   a monitor which outputs a signal having a level indicative of the temperature of the thermo-electric cooler,
   first apparatus that responds to the monitor signal and outputs a signal indicative of a difference between the temperature of the thermo-electric cooler and a desired thermo-electric cooler temperature, a signal generator for outputting a signal having a level that varies as a function of the level of a control signal derived from at least the level of the output signal and the value of the difference signal, second apparatus connected to first and second inputs of the thermoelectric cooler such that when the level of the difference signals is below a first reference signal connects the generated signal across said the first and second inputs as a signal of a first polarity to cause the thermo-electric cooler to enter a heating cycle and such that when the level of the difference signal is below a second reference signal connects the generated signal across said second and first inputs in reverse order as a signal of a second polarity to cause the thermo-electric cooler to enter a cooling cycle, and a dump circuit which shunts the level of the signal that the signal generator outputs to a predetermined level when the level of the difference signal is between the first and second reference levels.

2. The system of claim 1 wherein said second apparatus is an H-bridge circuit, and wherein said signal generator is a pulse-width-modulated power supply.

3. The system of claim 1 further comprising first and second comparators, in which the first and second comparators compare the level of the difference signal with the first and second reference levels, respectively, and wherein the dump circuit is activated when both comparisons fail.

4. The system of claim 3 further comprising a NAND gate having first and second inputs respectively connected to the outputs of the first and second comparators, and wherein the output of the NAND gate activates the dump circuit when both comparisons fail.

5. A system comprising a thermo-electric cooler, a monitor which outputs a signal having a level indicative of the temperature of the thermo-electric cooler, first apparatus that responds to the monitor signal and outputs a signal indicative of a difference between the temperature of the thermo-electric cooler and a desired thermo-electric cooler temperature a discriminator circuit having first and second reference levels such that when the level of the difference signal is below the first reference level then the discriminator circuit causes the thermoelectric cooler to enter a heating cycle and such that when the level of the difference signal reaches the second reference level then the discriminator circuit causes the thermo-electric cooler to enter a cooling cycle, an H-bridge circuit connected to an input of the thermo-electric cooler, said H-bridge circuit responsive to receipt of a first signal via a first path from the discriminator circuit extends a voltage signal of a first polarity to the thermo-electric cooler to cause the thermo-electric cooler to enter the heating cycle and responsive to receipt of the first signal via a second path from the discriminator circuit extends the voltage signal of the first polarity to the thermo-electric cooler as a voltage signal of a second polarity to cause the thermo-electric cooler to enter the cooling cycle, a pulse-width-modulated power supply whose output voltage signal varies as a function of a control signal derived from the output voltage the absolute value of the difference signal and a band-gap voltage signal, and wherein the output voltage signal is supplied directly to the H-bridge as the voltage signal of the first polarity and wherein when the level of the difference signal is between the first and second reference levels, then the discriminator activates a dump circuit which shunts to ground level the level of the voltage signal that the pulse-width-modulated power supply outputs and wherein the system further comprises a clamp circuit which clamps the level of the control signal supplied to the pulse-width-modulated power supply between third and fourth reference levels.

6. A system comprising a thermoelectric cooler, apparatus which measures the temperature of the thermo-electric cooler and outputs a difference signal indicative of a difference between the measured temperature and a desired temperature for the thermoelectric cooler, and a pulse-width-modulated power supply that varies the level of an output voltage signal as a function of a control signal derived from at least the output voltage level, and the absolute value of the difference signal, and wherein the output voltage signal is supplied to the thermo-electric cooler as a voltage signal of (a) a first polarity to cause the thermoelectric cooler to enter a heating cycle or (b) a second polarity to cause the thermo-electric cooler to enter a cooling cycle, and a dump circuit which shunts the level of the voltage signal that the power supply outputs to a predetermined level when the level of the difference signal is between first and second reference levels.

7. The system of claim 6 further comprising a discriminator circuit responsive to said first and second reference levels such that when the level of the difference signal is below the first reference level then the discriminator circuit causes the voltage signal of the first polarity to be supplied to the thermo-electric cooler and such that when the level of the difference signal reaches the second reference level then the discriminator circuit causes the voltage signal of the second polarity to be supplied to the thermo-electric cooler.

8. The system of claim 7 further comprising a dump circuit, wherein when the level of the difference signal is between the first and second reference levels, then the discriminator activates the dump circuit which then shunts to ground level the level of the voltage signal that the pulse-width-modulated power supply outputs.

9. The system of claim 8 wherein the discriminator includes first and second comparators, in which the first and second comparators compare the level of the difference signal with the first and second reference levels, respectively, and wherein the dump circuit is activated when both comparisons fail.

10. The system of claim 9 further comprising a NAND gate having first and second inputs respectively connected to the outputs of the first and second comparators, and wherein the output of the NAND gate activates the dump circuit when both comparisons fail.

11. The system of claim 7 further comprising an H-bridge circuit connected between the pulse-width-modulated power supply and thermo-electric cooler, said H-bridge circuit responsive to receipt of a first control signal via a first path from the discriminator circuit extends a voltage signal of the first polarity to the thermoelectric cooler to cause the thermo-electric cooler to enter a heating cycle, and responsive to receipt of the first signal via a second path from the discriminator circuit extends the voltage signal of the second polarity to cause the thermo-electric cooler to enter a cooling cycle.

12. A system comprising a thermo-electric cooler, apparatus which measures the temperature of the thermo-electric cooler and outputs a difference signal indicative of a difference between the measured temperature and a desired temperature for the thermoelectric cooler, a pulse-width-modulated power supply that varies the level of an output voltage signal as a function of a control signal derived from at least the output voltage level, and the absolute value of the difference signal, and wherein the output voltage signal is supplied to the thermoelectric cooler as a voltage signal of (a) a first polarity to cause the thermo-electric cooler to enter a heating cycle or (b) a second polarity to cause the thermo-electric cooler to enter a cooling cycle, and a clamp circuit which clamps the level of the control signal supplied to the pulse-width-modulated power supply between third and fourth reference levels.

\* \* \* \* \*